US012220909B2

(12) United States Patent
Fukui et al.

(10) Patent No.: US 12,220,909 B2
(45) Date of Patent: Feb. 11, 2025

(54) PRINTING APPARATUS

(71) Applicant: CANON KABUSHIKI KAISHA, Tokyo (JP)

(72) Inventors: Kohei Fukui, Tokyo (JP); Kota Uchida, Kanagawa (JP); Yoshiaki Suzuki, Chiba (JP); Takakazu Ohashi, Kanagawa (JP); Kengo Nieda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 76 days.

(21) Appl. No.: 18/108,415

(22) Filed: Feb. 10, 2023

(65) Prior Publication Data

US 2023/0264495 A1 Aug. 24, 2023

(30) Foreign Application Priority Data

Feb. 24, 2022 (JP) ................................ 2022-027011

(51) Int. Cl.
*B41J 13/03* (2006.01)
*B41J 2/01* (2006.01)
(Continued)

(52) U.S. Cl.
CPC ................ *B41J 13/03* (2013.01); *B41J 2/01* (2013.01); *B41J 11/0005* (2013.01);
(Continued)

(58) Field of Classification Search
CPC . B41J 13/03; B41J 2/01; B41J 11/0005; B41J 11/0045; B41J 11/005; B41J 11/02; B41J 11/06
See application file for complete search history.

(56) References Cited

U.S. PATENT DOCUMENTS 5,356,229 A * 10/1994 Hickman ................ B41J 11/20 400/642
5,993,094 A 11/1999 Lee
(Continued)

FOREIGN PATENT DOCUMENTS

| | | | |
|---|---|---|---|
| EP | 0 627 322 | A2 | 12/1994 |
| JP | 4442456 | B2 | 3/2010 |
| JP | 2016-160024 | A | 9/2016 |

OTHER PUBLICATIONS

Extended European Search Report dated Jul. 5, 2023, in European Patent Application No. 23154818.1.
(Continued)

*Primary Examiner* — Henok D Legesse
(74) *Attorney, Agent, or Firm* — Venable LLP

(57) ABSTRACT

A printing apparatus includes a conveyance unit, a printing unit, a platen section facing the printing unit, a regulation unit arranged on a downstream side of the printing unit in the conveyance direction and configured to regulate a height position of the print medium, and a guide section arranged on a downstream side of the platen section. The guide section includes a first declined section, a second declined section arranged on the downstream side of the first declined section in the conveyance direction, and an inclined section inclined from the second declined section to the downstream side in the conveyance direction. A declination of the second declined section is more moderate than that of the first declined section, and the regulation unit faces the guide section.

12 Claims, 11 Drawing Sheets

(51) Int. Cl.

| | |
|---|---|
| ***B41J 11/00*** | (2006.01) |
| ***B41J 11/02*** | (2006.01) |
| ***B41J 11/06*** | (2006.01) |

(52) U.S. Cl.

CPC .......... *B41J 11/0045* (2013.01); *B41J 11/005* (2013.01); *B41J 11/02* (2013.01); *B41J 11/06* (2013.01)

(56) References Cited

U.S. PATENT DOCUMENTS

| | | | | |
|---|---|---|---|---|
| 9,308,747 | B2 | 4/2016 | Winters et al. | |
| 9,533,517 | B2 * | 1/2017 | Ito | B41J 13/03 |
| 11,433,693 | B2 * | 9/2022 | Furusawa | B41J 3/4071 |
| 2001/0014241 | A1 | 8/2001 | Huang et al. | |
| 2022/0169477 | A1 | 6/2022 | Fukui et al. | |

OTHER PUBLICATIONS

U.S. Appl. No. 18/108,289, Kota Uchida Kohei Fukui Yoshiaki Suzuki Takakazu Ohashi Kengo Nieda, filed Feb. 10, 2023.
U.S. Appl. No. 18/108,289, Takakazu Ohashi Kota Uchida Yoshiaki Suzuki Kengo Nieda Kohei Fukui, filed Feb. 10, 2023.

* cited by examiner

PRINTING APPARATUS

BACKGROUND OF THE INVENTION

Field of the Invention

The present invention relates to a printing apparatus.

Description of the Related Art

A printing apparatus performs printing by a printhead while conveying a print medium between the printhead and a platen. If the print medium is curled, it may lift during conveyance and contact the printhead. Print medium curling occurs even in a cut sheet. In a roll sheet, significant curling tends to occur because of its wound state. Japanese Patent No. 04442456 discloses a technique for suppressing a lift of a print medium by the guide surface shape of the leading edge of the print medium. Also, Japanese Patent Laid-Open No. 2016-160024 discloses a technique for suppressing a lift of a print medium by providing a dedicated spur.

The position where a lift occurs until the leading edge of the print medium passes through the printhead and reaches a discharge roller may change depending on the stiffness or the degree of curling of the print medium. If the position of a lift can be controlled, it is easy to take a measure.

SUMMARY OF THE INVENTION

The present invention provides a technique for controlling a position where a lift of a print medium occurs and suppressing it.

According to an aspect of the present invention, there is provided a printing apparatus comprising: a conveyance unit configured to convey a print medium in a conveyance direction; a printing unit configured to print an image on the print medium conveyed by the conveyance unit; a platen section facing the printing unit and configured to support, from a lower side, the print medium conveyed by the conveyance unit; a regulation unit arranged on a downstream side of the printing unit in the conveyance direction and configured to regulate a height position of the print medium from above the print medium, and a guide section arranged on a downstream side of the platen section in the conveyance direction and configured to guide the conveyance of the print medium, wherein the guide section includes: a first declined section declined, from the platen section to the downstream side in the conveyance direction, in a direction of separating from a support height of the print medium in the platen section; a second declined section arranged on the downstream side of the first declined section in the conveyance direction and declined, to the downstream side in the conveyance direction, in the direction of separating from the support height; and an inclined section inclined, from the second declined section to the downstream side in the conveyance direction, in a direction of approaching the support height, a declination of the second declined section is more moderate than the first declined section, and the regulation unit faces the guide section.

Further features of the present invention will become apparent from the following description of exemplary embodiments (with reference to the attached drawings).

DESCRIPTION OF THE EMBODIMENTS

Figure 1:
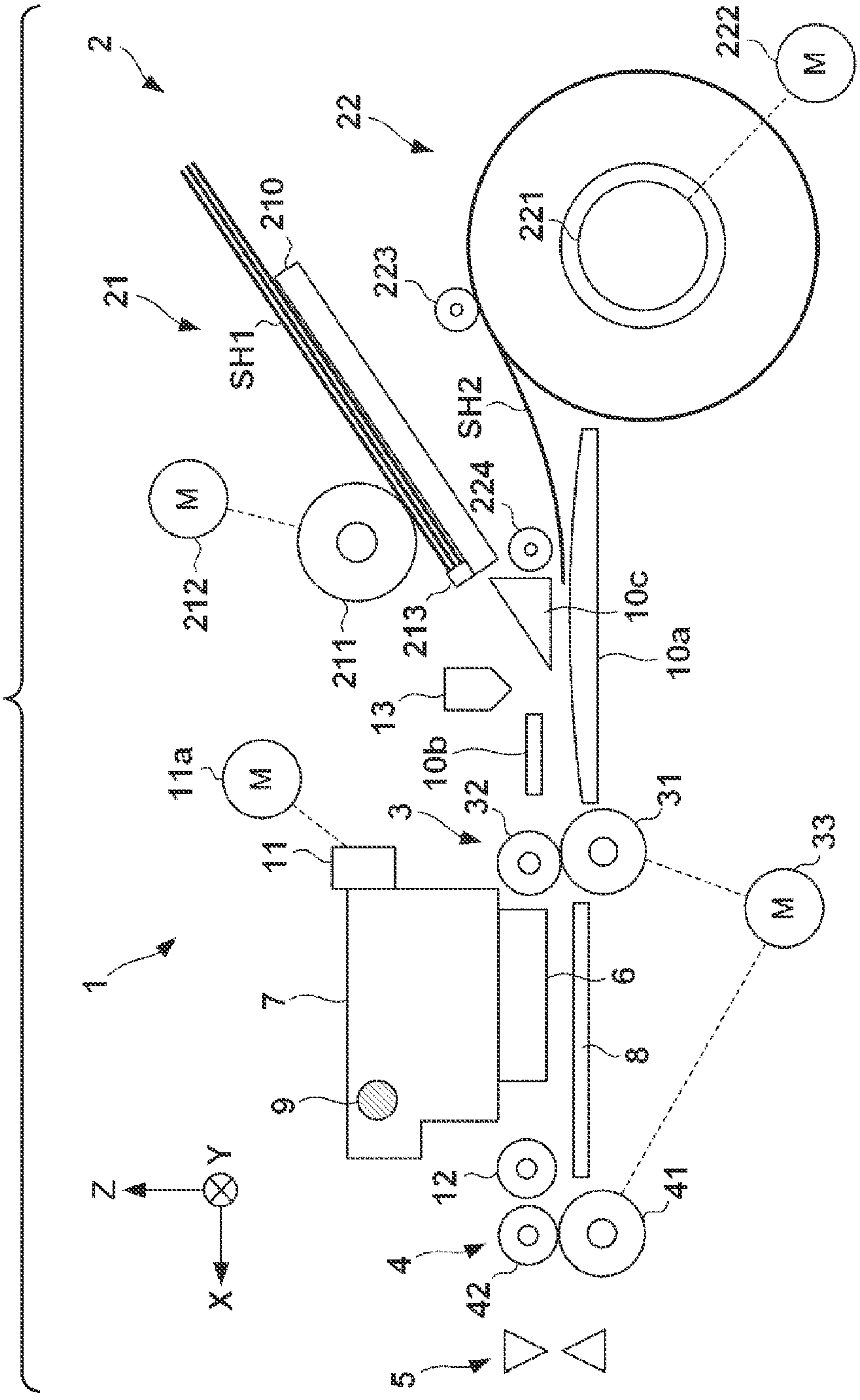
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Outline of Printing Apparatus>

FIG. 1 is a schematic view of a printing apparatus 1 according to this embodiment. In this embodiment, a case will be described in which the present invention is applied to a serial type inkjet printing apparatus, but the present invention is also applicable to printing apparatuses of other types. In the drawings, an arrow X and an arrow Y indicate horizontal directions orthogonal to each other, and an arrow Z indicates a vertical direction. A downstream side and an upstream side are based on the conveyance direction of a print medium.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

The printing apparatus 1 includes, as a mechanism for conveying a print medium, a feed unit 2, a conveyance unit 3, and a discharge unit 4, which are arranged from the upstream side in the conveyance direction of a print medium. In the following description, an upstream side and a downstream side are based on the conveyance direction of a print medium. The feed unit 2 includes a feed unit 21 which feeds a sheet SH1 as a print medium, and a feed unit 22 which feeds, as a print medium, a sheet SH2 different from the sheet SH1. In this embodiment, the print media for printing can be selectively fed by the two feed units 21 and 22.

The feed unit 21 includes a feeder tray 210 (stacking section) on which a plurality of sheets SH1 can be stacked, a feed roller 211, and a separation section 213. The sheet SH1 is a cut sheet (to be sometimes referred to as the cut sheet SH1 hereinafter) stacked on the feeder tray 210 in a posture in which the widthwise direction of the sheet SH1 matches the Y direction. The feed roller 211 is rotated by a driving force of a feed motor 212, and abuts against the top cut sheet SH1 stacked on the feeder tray 210, thereby conveying it to the downstream side. The separation section 213 is provided in the downstream-side end section of the feeder tray 210. The separation section 213 has a structure (for example, separation claws) which separates the cut sheets SH1 on the feeder tray 210 one by one upon conveying the cut sheets SH1 by the feed roller 211.

The sheet SH2 is a roll sheet obtained by winding one sheet into a roll form around a cylindrical core (to be sometimes referred to as the roll sheet SH2). The feed unit 22 includes a support section 221 which rotatably supports the roll sheet SH2. The roll sheet SH2 is supported in a posture in which the widthwise direction of the roll sheet SH2 (the axial direction of the roll) matches the Y direction. The support section 221 is rotated by a driving force of a feed motor 222, thereby rotating the roll sheet SH2. Depending on the rotation direction of the feed motor 222, a feed operation of feeding the roll sheet SH2 to the downstream side and a winding operation can be performed. The feed unit 22 includes a roller 223 which is pressed against the outer peripheral surface of the roll sheet SH2 by a spring or the like (not shown). The roller 223 is a free rotary body, and presses the outer peripheral surface of the roll sheet SH2 such that the feed operation and the winding operation of the roll sheet SH2 are stably performed.

A rotation of the support section 221 causes the roll sheet SH2 to pass between a sheet guide 10 and a roller 224, which is a free rotary body arranged so as to face the sheet guide 10, and be conveyed to the downstream side. The conveyance path of the cut sheet SH1 and the conveyance path of the roll sheet SH2 are merged at a merging section on the downstream side of a partition member 10*c*. The conveyance path after merging passes between a sheet guide 10*a* and a sheet guide 10*b* facing the sheet guide 10*a* and reaches the conveyance unit 3.

The conveyance unit 3 is arranged on the upstream side of a printhead 6 and conveys the print medium (cut sheet SH1 or roll sheet SH2) conveyed by the feed unit 2 to the printhead 6. The conveyance unit 3 includes a driving roller 31 and a driven roller 32 (pinch roller) pressed against the driving roller 31 by a spring or the like (not shown). The driving roller 31 is rotated by a driving force of a conveyance motor 33. A forward rotation of the conveyance motor 33 causes the print medium to be nipped in a nip section between the driving roller 31 and the driven roller 32, and the print medium (cut sheet SH1 or roll sheet SH2) is conveyed between the printhead 6 and a support member 8 to the downstream side in the X direction. Upon the winding operation of the roll sheet SH2, a backward rotation of the conveyance motor 33 can cause the conveyance unit 3 to convey the roll sheet SH2 to the upstream side.

The support member 8 is a member configured to support, from the lower side, the print medium conveyed by the conveyance unit 3. In this embodiment, the support member 8 is one member, but may be formed by a plurality of members divided in the X direction. A regulation member 12 is arranged at a position facing the support member 8 to regulate the height position of the print medium from above the print medium, thereby regulating a lift of the print medium.

The discharge unit 4 is arranged on the downstream side of the printhead 6 and conveys the print medium (cut sheet SH1 or roll sheet SH2) conveyed by the conveyance unit 3 to the outside of the apparatus. The discharge unit 4 includes a driving roller 41, and a spur 42 arranged to face the driving roller 41 and pressed against the driving roller 41 by a spring or the like (not shown). The driving roller 41 is a rotary member that is rotated by a driving force of the conveyance motor 33 and conveys the print medium to the downstream side. The spur 42 is a rotary member capable of rotating together with the driving roller 41, and the print medium is nipped in the nip section between the driving roller 41 and the spur 42 and conveyed.

Note that in this embodiment, the conveyance motor 33 is shared by the conveyance unit 3 and the discharge unit 4, but a configuration in which individual motors are provided may be employed.

A cutting unit 5 is provided on the downstream side of the discharge unit 4. The cutting unit 5 cuts the roll sheet SH2 having undergone printing. The cutting unit 5 includes, for example, a cutter including circular round blades arranged one above and one below and a moving mechanism (not shown) that moves the cutter in a direction (the Y direction in this embodiment) intersecting the conveyance direction of the print medium. The cutter stands by outside the conveyance path of the print medium. At the time of cutting, the cutter is moved so as to cross the conveyance path, thereby cutting the roll sheet SH2.

The printhead 6 is arranged on the downstream side of the conveyance unit 3 and the upstream side of the discharge unit 4. The printhead 6 performs printing on the print medium (cut sheet SH1 or roll sheet SH2). In this embodiment, the printhead 6 is an inkjet printhead that performs printing on a print medium by discharging ink. The printhead 6 is supported by a carriage 7.

The carriage 7 is reciprocated by a driving unit 11 in the direction intersecting the print medium. In this embodiment, the carriage 7 is reciprocated in the Y direction by the guide of a guide shaft 9 extending in the Y direction. The driving unit 11 is a mechanism using a carriage motor 11*a* as a driving source, and is, for example, a belt transmission mechanism including a driving pulley and a driven pulley, which are apart in the Y direction, and an endless belt wound around these pulleys. The carriage 7 is connected to endless belt. When the carriage motor 11 a rotates the driving pulley, the endless belt travels, and the carriage 7 moves. The printhead 6 may be exchangeably attached to the carriage 7.

As described above, the printing apparatus 1 according to this embodiment is a serial type printing apparatus in which the printhead 6 is mounted on the carriage 7. By repeating a conveyance operation (intermittent conveyance operation) of conveying the print medium by a predetermined amount by the conveyance unit 3 and a printing operation performed while the conveyance by the conveyance unit 3 is stopped, print control of the print medium is performed. The printing operation is an operation of discharging ink from the printhead 6 while moving the carriage 7 mounted with the printhead 6.

The printing apparatus 1 includes a detection unit 13. The detection unit 13 detects the print medium at a position on the upstream side of the conveyance unit 3 and on the downstream side of the feed unit 2. The detection unit 13 is, for example, an optical sensor that detects the print medium. Alternatively, the detection unit 13 is formed by, for example, an arm member which is provided in the conveyance path of the print medium so as to be swingable and swings due to interference with the print medium, and a sensor that detects the swinging motion of the arm member.

<Control Unit>

Figure 2:
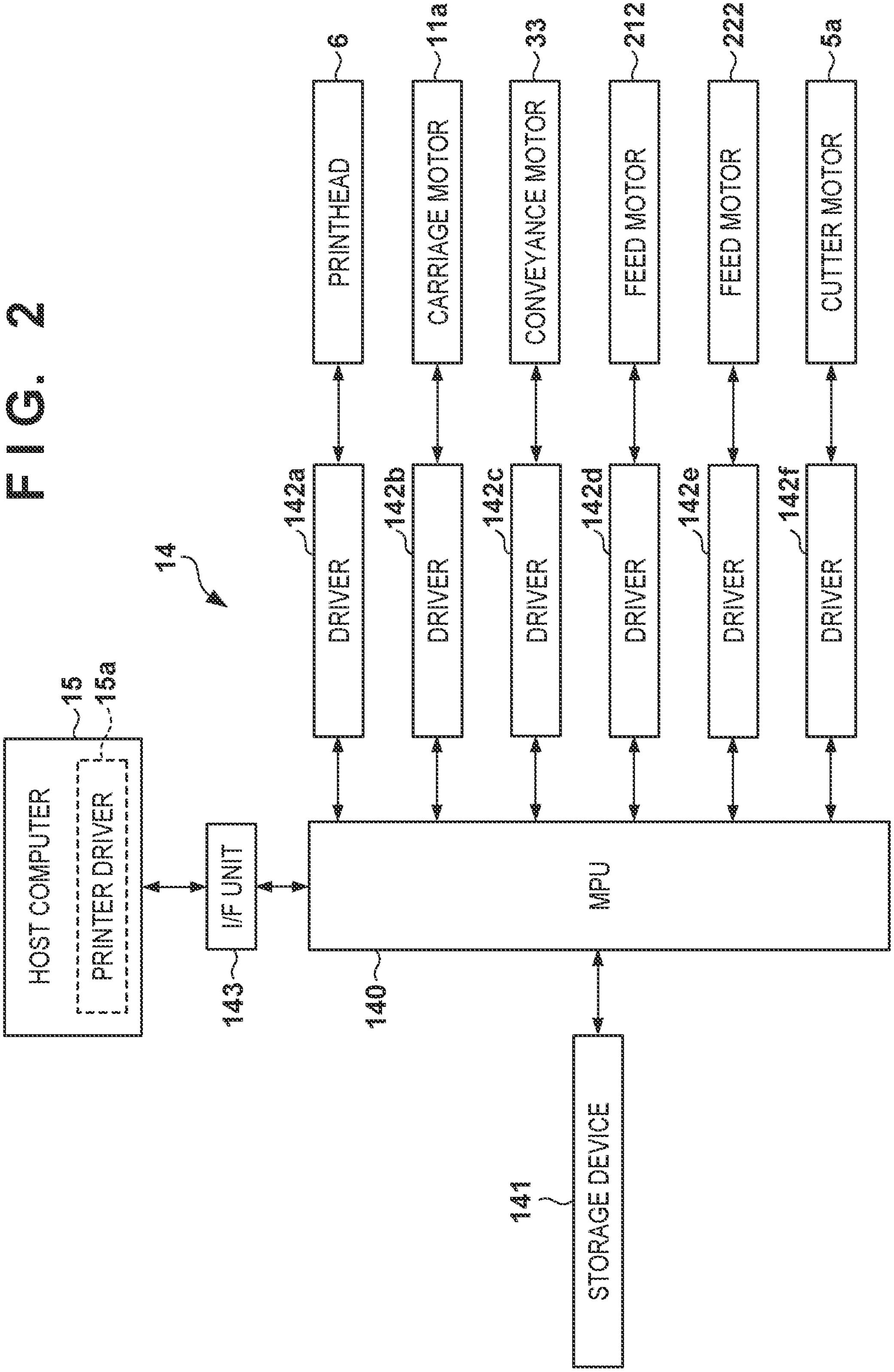
FIG. 2 is a block diagram of the control unit of the printing apparatus shown in FIG. 1.

FIG. 2 is a block diagram of a control unit 14 of the printing apparatus 1. An MPU 140 is a processor that controls respective operations of the printing apparatus 1, and controls data processing and the like. The MPU 140 controls the entire printing apparatus 1 by executing programs stored in a storage device 141. The storage device 141 is formed by, for example, a ROM or a RAM. The storage device 141 stores, in addition to programs executed by the MPU 140, various kinds of data required for processing such as data received from a host computer 15.

The MPU 140 controls the printhead 6 via a driver 142*a*. The MPU 140 controls the carriage motor 11*a* via a driver 142*b*. The MPU 140 also controls the conveyance motor 33, the feed motors 212 and 222, and a cutter motor 5*a* via drivers 142*c* to 142*f*, respectively. The cutter motor 5*a* is a driving source of the cutting unit 5.

The host computer 15 is, for example, a personal computer or a mobile terminal (for example, a smartphone, a tablet terminal, or the like) used by a user. The host computer 15 is installed with a printer driver 15*a* which performs communication between the host computer 15 and the printing apparatus 1. The printing apparatus 1 includes an interface unit 143, and communication between the host computer 15 and the MPU 140 is performed via the interface unit 143. For example, when the user inputs an execution instruction of print control to the host computer 15, the printer driver 15*a* collects data of an image to be printed and setting regarding the printing (information such as the quality of the print image), and instructs the printing apparatus 1 to execute print control. An execution instruction of print control is sometimes referred to as a print job.

<Lift Suppression>

Figure 3:
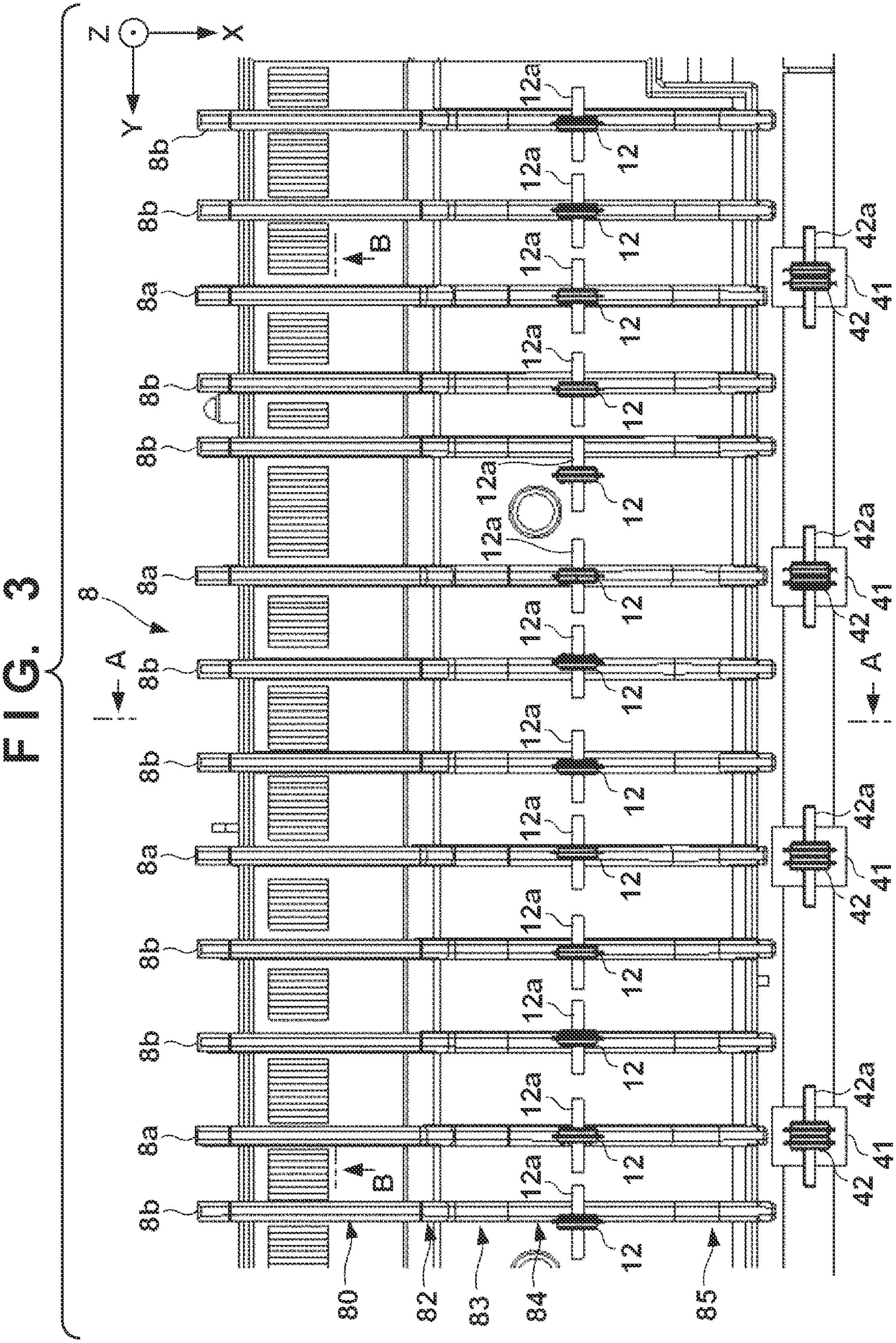
FIG. 3 is a plan view of a support member.
Figure 4:
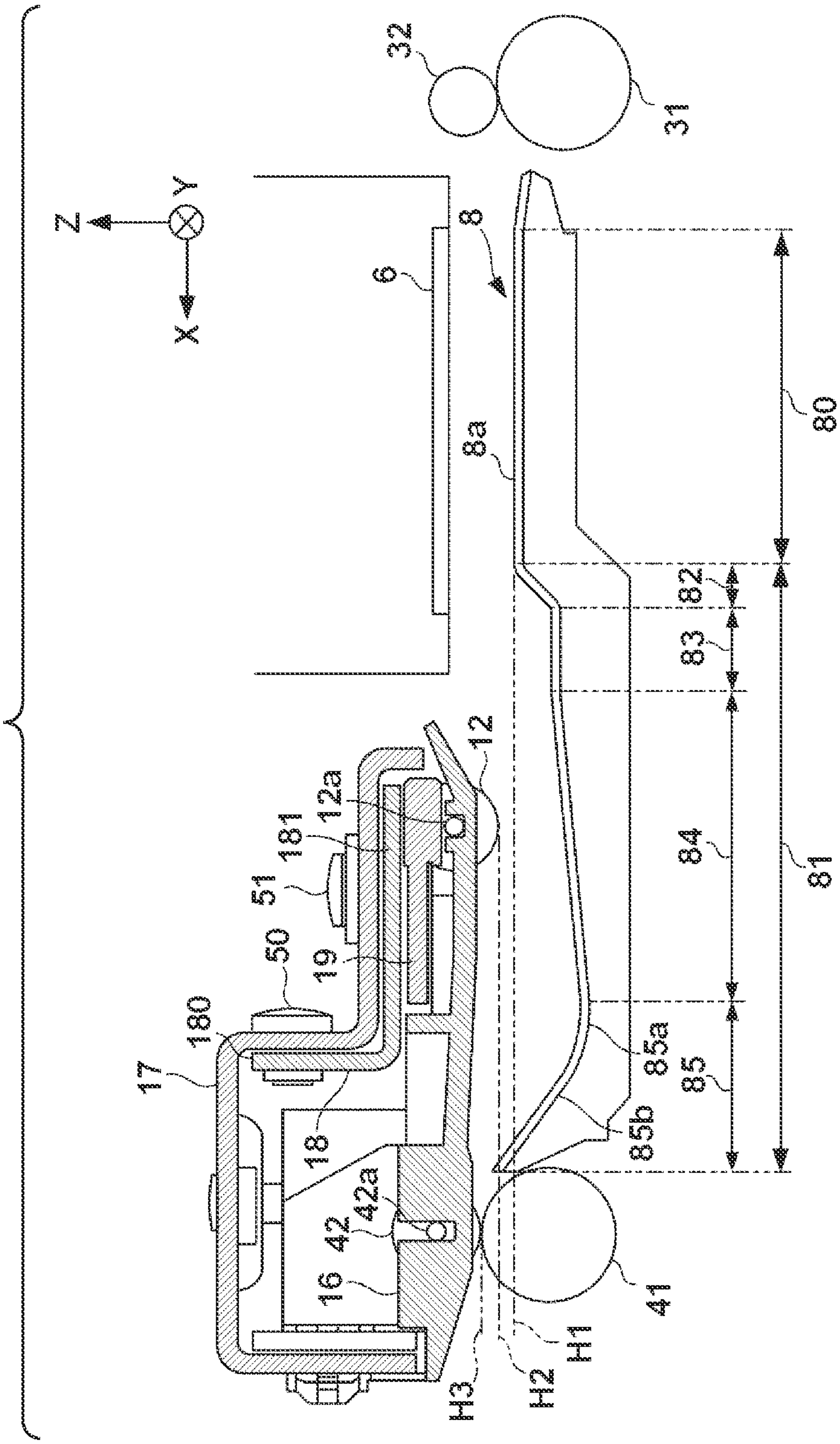
FIG. 4 is a sectional view taken along a line A-Ain FIG. 3.
Figure 5:
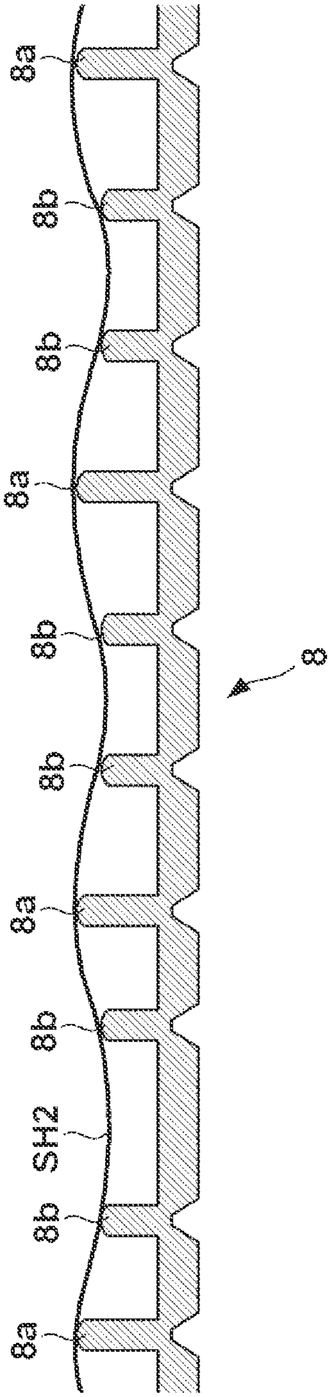
FIG. 5 is a sectional view taken along a line B-B in FIG. 3.

A structure for suppressing a lift of a print medium will be described in correspondence with FIGS. 3 to 5. FIG. 3 is a plan view of the support member 8, in which the spur 42 and the regulation member 12 are also shown. FIG. 4 is a sectional view taken along a line A-A in FIG. 3, and FIG. 5 is a sectional view taken along a line B-B in FIG. 3;

The support member 8 includes a plurality of ribs 8*a* and 8*b* arrayed in the Y direction. Each of the ribs 8*a* and 8*b* is a plate-shaped member extending in the X direction, and their tops form the conveyance support surface for a print medium. In this embodiment, the rib 8*a* and the rib 8*b* have different heights (Z-direction lengths). The plurality of relatively low ribs 8*b* are arranged between the relatively high ribs 8*a*. For this reason, even if the print medium extends upon application of ink, the print medium can be supported along the relatively low ribs 8*b*. FIG. 5 shows a mode in which the extended roll sheet SH2 is supported by the ribs 8*a* and the ribs 8*b*. That is, it is possible to prevent the print medium from extending and curving upward and thus prevent the print medium from contacting the printhead 6.

Note that the rib 8*a* and the rib 8*b* are different only in the height and have the same contour shape (the profile on the X-Z plane). The configuration of the ribs 8*a* will mainly be described below, and the description also applies to the ribs 8*b*.

The rib 8*a* includes a plurality of parts in the X direction. More specifically, the rib 8*a* includes a platen section 80 and a guide section 81. The platen section 80 is a part facing the printhead 6, and forms a support surface flat in the X direction.

The guide section 81 is a part that guides the movement of the leading edge of the print medium that has passed through the printhead 6. The guide section 81 includes a declined section 82, a connecting section 83, a declined section 84, and an inclined section 85 sequentially from the upstream side. The declined section 82 is started from a position slightly on the upstream side of the downstream end (nozzles at the downstream end) of the printhead 6 in the X direction, and with respect to a support height H1 of the print medium in the platen section 80 as a reference, forms a declination declined in a direction of separating from the support height H1 to the downstream side. The declination is a linear declination without curves. The connecting section 83 is a section that connects the declined section 82 and the declined section 84, and is a flat surface parallel to the support height H1. The declined section 82 and the declined section 84 may continuously be formed without providing the connecting section 83.

The declined section 84 forms a declination declined in a direction of separating from the support height H1 to the downstream side. However, the declination is more moderate than that of the declined section 82. The declination is a linear declination without curves. The inclined section 85 forms an inclination inclined in a direction of approaching the support height H1 to the downstream side. The inclined section 85 includes a curved section 85*a* on the upstream side, and a linear section 85*b* that continues from the curved section 85*a* to the downstream side. The curved section 85*a* is a section extended from the lower end of the declined section 84 to form an arc such that the declination smoothly transitions to an inclination. The linear section 85*b* is a linear inclined surface without curves.

In this embodiment, the regulation member 12 is a rotary member in a form similar to the spur 42 and can freely rotate about a shaft 12*a* in the Y direction. Note that the regulation member 12 need only have a form capable of contacting the print medium and preventing its lift. Not a rotary member as in this embodiment but a fixed member may be used. However, if a rotary member is used, like this embodiment, the conveyance of the print medium whose lift is regulated can be continued more smoothly.

The regulation member 12 is arranged at a position facing the guide section 81 and, more particularly, arranged at a position facing the declined section 84. If arranged at this position, the regulation member 12 can more reliably regulate a lift of the print medium when the leading edge of the print medium moves from the declined section 84 to the inclined section 85 and the print medium lifts. The relationship between the support height H1 of the platen section 80, a regulation position (regulation height) H2 of the regulation member 12, and a height H3 of the nip position of the discharge unit 4 is given by H1<H2<H3. By this height relationship, the regulation member 12 can more reliably regulate a lift of the print medium.

A plurality of regulation members 12 are provided, and these are provided at positions corresponding to the ribs 8*a* and 8*b* in the Y direction. More specifically, each regulation member 12 is arranged to face one of the ribs 8*a* and 8*b*. This can regulate a lift of the print medium at an arbitrary position in the widthwise direction (Y direction) of the print medium.

FIGS. 6A to 7B are explanatory views showing an example in which a lift of a print medium is regulated. An example in which the roll sheet SH2 is conveyed will be described here, and the description also applies to the cut sheet SH1.

Figure 6A:
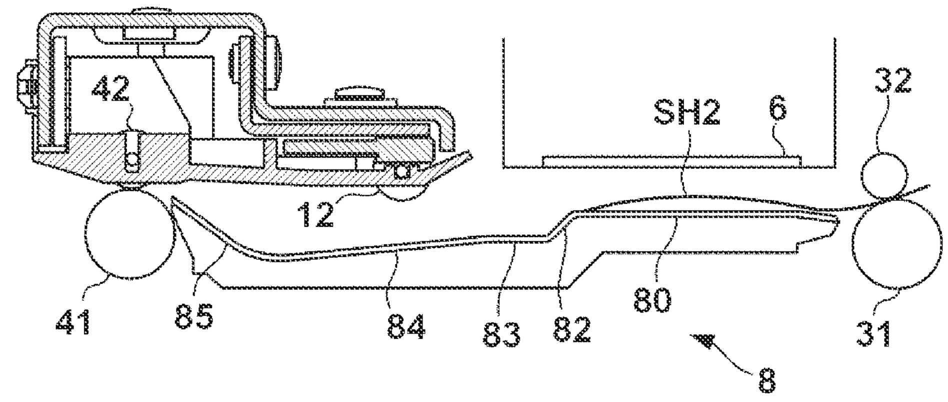
FIGS. 6A to 6C are explanatory views showing an example in which a lift of a print medium is regulated.
Figure 6B:
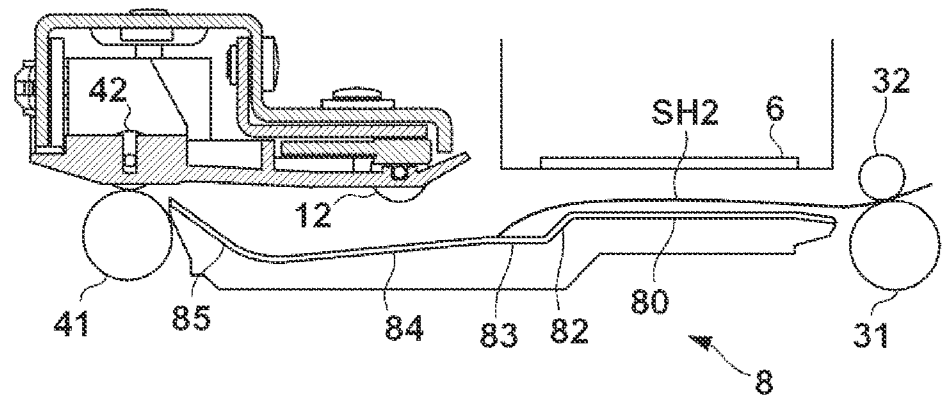

FIG. 6A shows a stage in which the leading edge of the roll sheet SH2 is moving on the platen section 80. Printing is sometimes started at this stage by discharging ink from the printhead 6. When the conveyance of the roll sheet SH2 progresses, the leading edge of the roll sheet SH2 passes through the declined section 82 and reaches the connecting section 83, as shown in FIG. 6B.

Since the declined section 82 guides the leading edge of the roll sheet SH2 downward, even if the roll sheet SH2 is curled downward, it can be prevented from lifting to the side of the printhead 6. In particular, since the declined section 82 is a relatively steep declination, even if the curl near the leading edge of the roll sheet SH2 is strong, the lift of the roll sheet SH2 can be reduced.

Figure 6C:
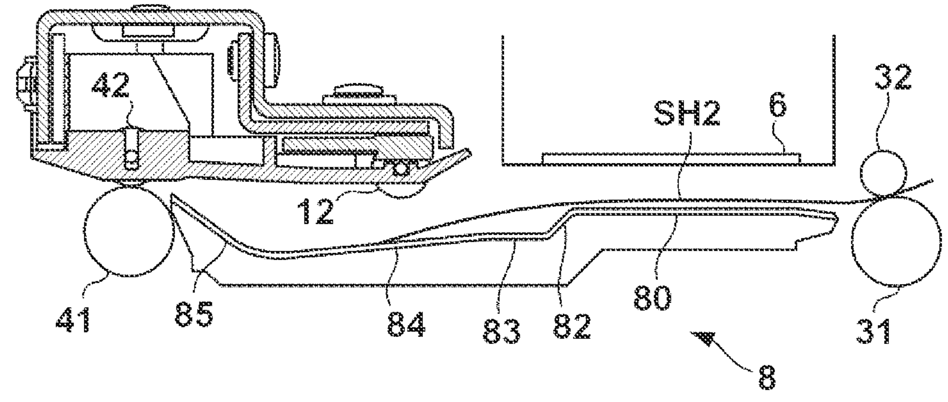

When the conveyance of the roll sheet SH2 progresses, the leading edge of the roll sheet SH2 reaches the declined section 84, as shown in FIG. 6C. The declined section 84 guides the leading edge of the roll sheet SH2 downward, and a state in which the lift of the roll sheet SH2 is little can be continued. If the declined section 84 is a flat surface, like the connecting section 83, the lift of the roll sheet SH2 may grow depending on the curl state of the roll sheet SH2. However, since the relatively moderate declined section 84 guides the leading edge of the roll sheet SH2, the growth of the lift of the roll sheet SH2 is suppressed. The declined section 84 is the longest section in the X direction in the guide section 81, and is a section longer than each of the declined section 82 and the connecting section 83 and also than the total length of the declined section 82 and the connecting section 83. It is possible to, by the declined section 84, ensure the conveyance distance from the printhead 6 to the discharge unit 4 while suppressing the growth of the lift of the roll sheet SH2.

Figure 7A:
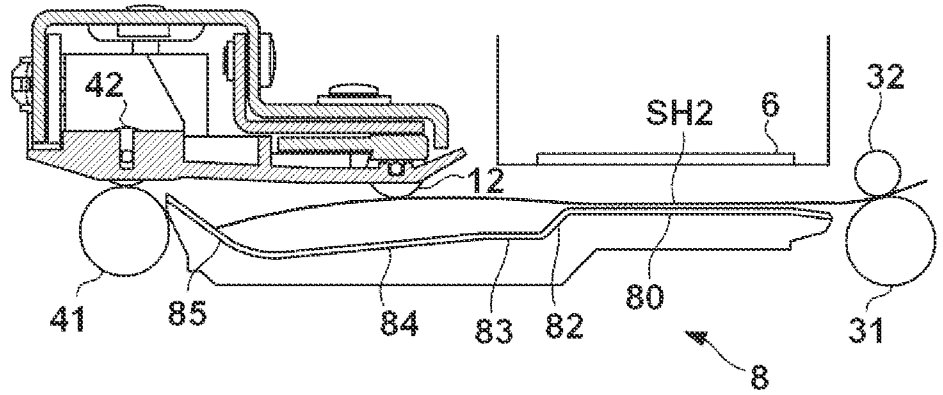
FIGS. 7A and 7B are explanatory views showing an example in which a lift of a print medium is regulated.

When the conveyance of the roll sheet SH2 progresses, the leading edge of the roll sheet SH2 reaches the inclined section 85, as shown in FIG. 7A. For this reason, the lift of the roll sheet SH2 grows. However, since the lift of the roll sheet SH2 is regulated by the regulation member 12, as shown in FIG. 7A, a lift of the roll sheet SH2 immediately under the printhead 6 can be suppressed.

In this embodiment, to control the position where the lift of the roll sheet SH2 grows, the declined section 84 and the inclined section 85 are continued. That is, on the declined section 84, the growth of the lift of the roll sheet SH2 is suppressed by the declination. On the other hand, the lift abruptly grows on the inclined section 85. In particular, since the curved section 85*a* is formed at the end section of the inclined section 85 on the upstream side, the lift of the roll sheet SH2 abruptly grows. However, the lift of the roll sheet SH2 can be suppressed by the regulation member 12.

Thus, in this embodiment, the position where the lift of the roll sheet SH2 occurs is structurally limited, and the lift of the roll sheet SH2 is regulated by the regulation member 12 in correspondence with this position. It is possible to prevent the position where the lift occurs from varying depending on the stiffness or the degree of curling of the roll sheet SH2 and control the position where the lift occurs and thus effectively suppress the lift.

Figure 7B:
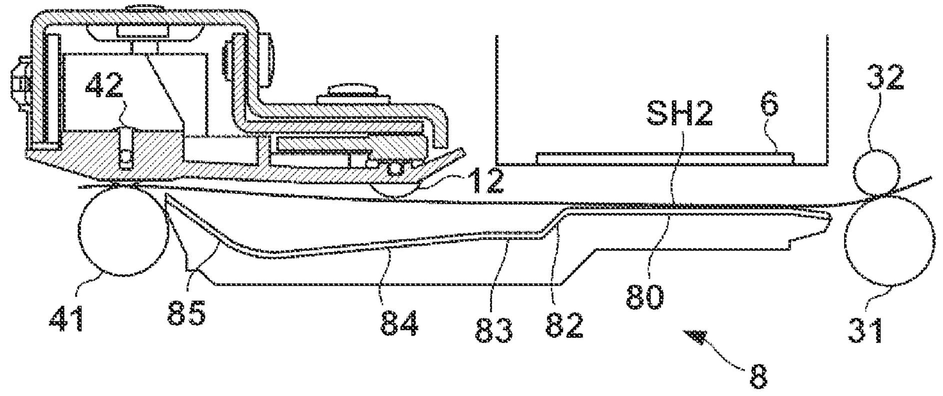

When the conveyance of the roll sheet SH2 progresses, the leading edge of the roll sheet SH2 reaches the nip section of the discharge unit 4, as shown in FIG. 7B. Since the height H3 of the nip position of the discharge unit 4 is located at a position higher than the regulation position H2 of the regulation member 12, the lift of the roll sheet SH2 is continuously regulated by the regulation member 12.

Thus, in this embodiment, the position where a lift of the print medium occurs is controlled, thereby suppressing it. According to this embodiment, even if the platen section 80 does not have, for example, a structure for sucking the print medium, a lift of the print medium can be suppressed, and the printing apparatus 1 of low cost and small size can be provided.

<Height Adjusting Structure of Regulation Member>

A structure for adjusting the height of the regulation member 12 will be described. When the height of the regulation member 12 is adjusted, the lift of the print medium can more reliably be suppressed. As shown in FIG. 4, the regulation member 12 is supported by a holding member 16 together with the spur 42. The spur 42 is rotatably supported by the holding member 16 via a spring shaft 42*a*, and is also biased against the discharge roller 41 by the spring shaft 42*a*. The regulation member 12 is supported by the holding member 16 via the shaft 12*a*.

A height adjustment member 18 is interposed between the holding member 16 and a base member 17. The holding member 16 is supported by the base member 17 via the height adjustment member 18. The base member 17 is fixed to the frame (not shown) of the printing apparatus 1. The height adjustment member 18 includes a plate section 180 on the Y-Z plane, and a plate section 181 on the X-Y plane, which is bent from the plate section 180, so that the vertical cross-section has an L shape as a whole. The height adjustment member 18 can be formed by an L-shaped sheet metal member, and can be formed relatively thin. This can prevent the printing apparatus 1 from becoming bulky. The base member 17 and the height adjustment member 18 are fixed by a screw 50 in one plate section 180. The height adjustment member 18 and the holding member 16 are fixed by a screw 51 via a spacer 19 in the other plate section 181.

Figure 8:
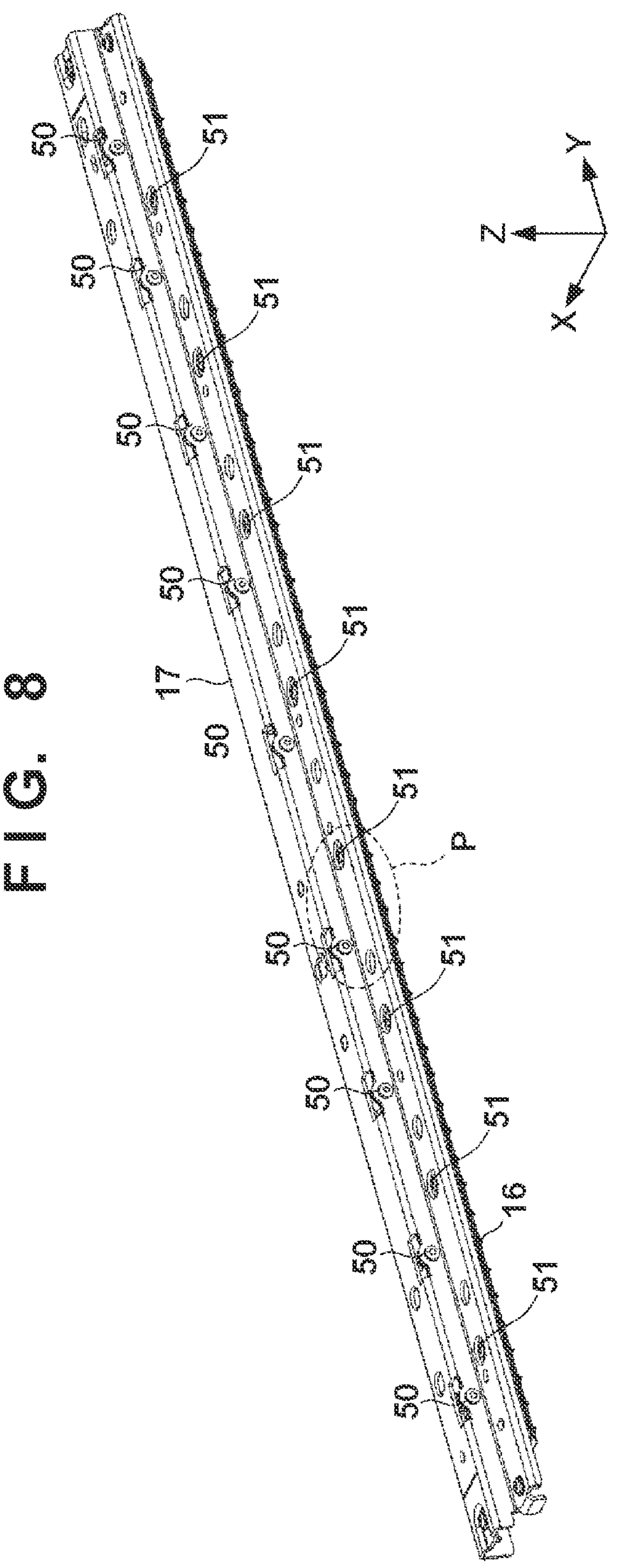
FIG. 8 is a perspective view of the assembly of a holding member, a base member, and a height adjustment member.
Figure 9:
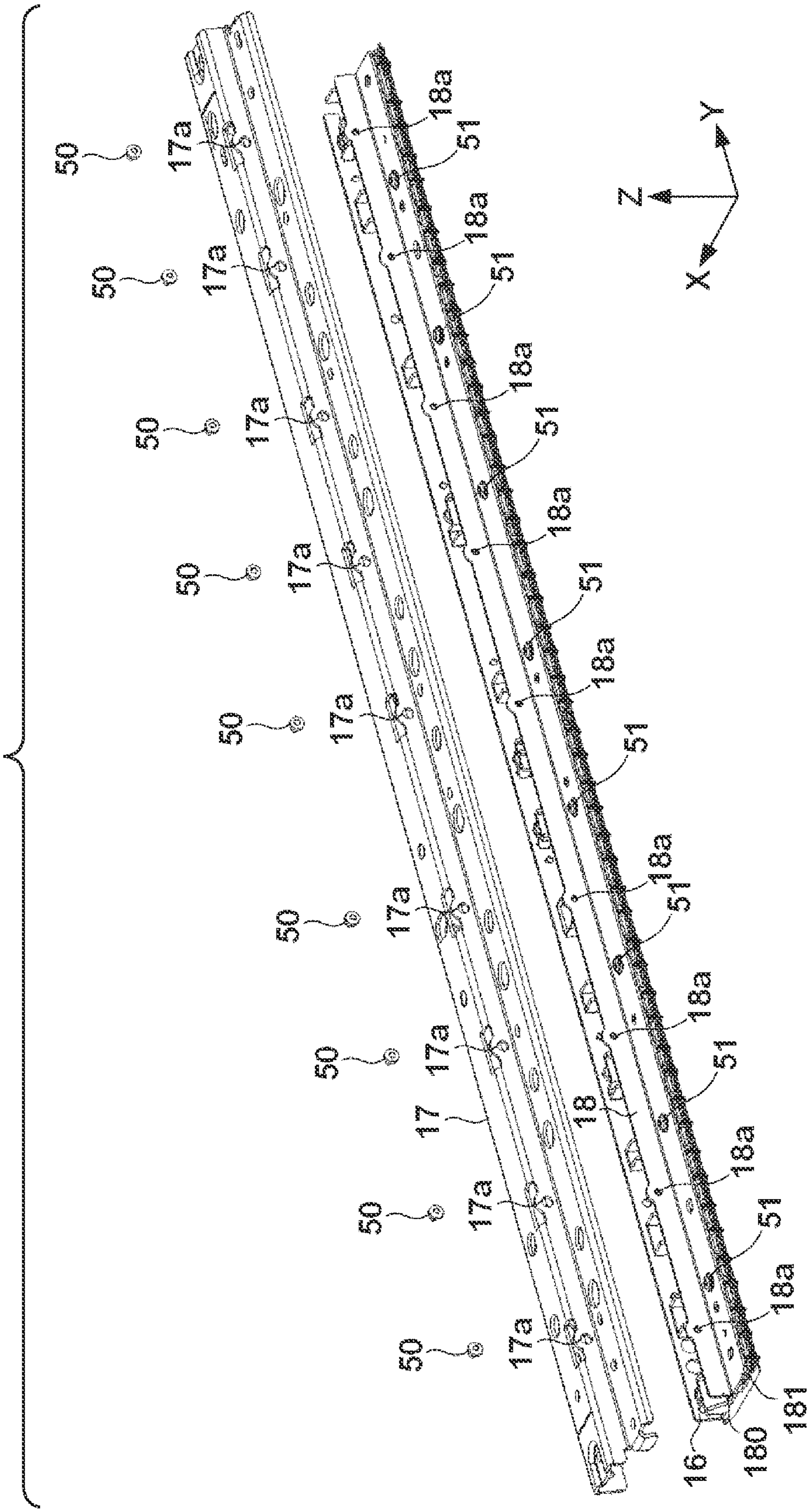
FIG. 9 is an exploded perspective view of the assembly shown in FIG. 8.
Figure 10:
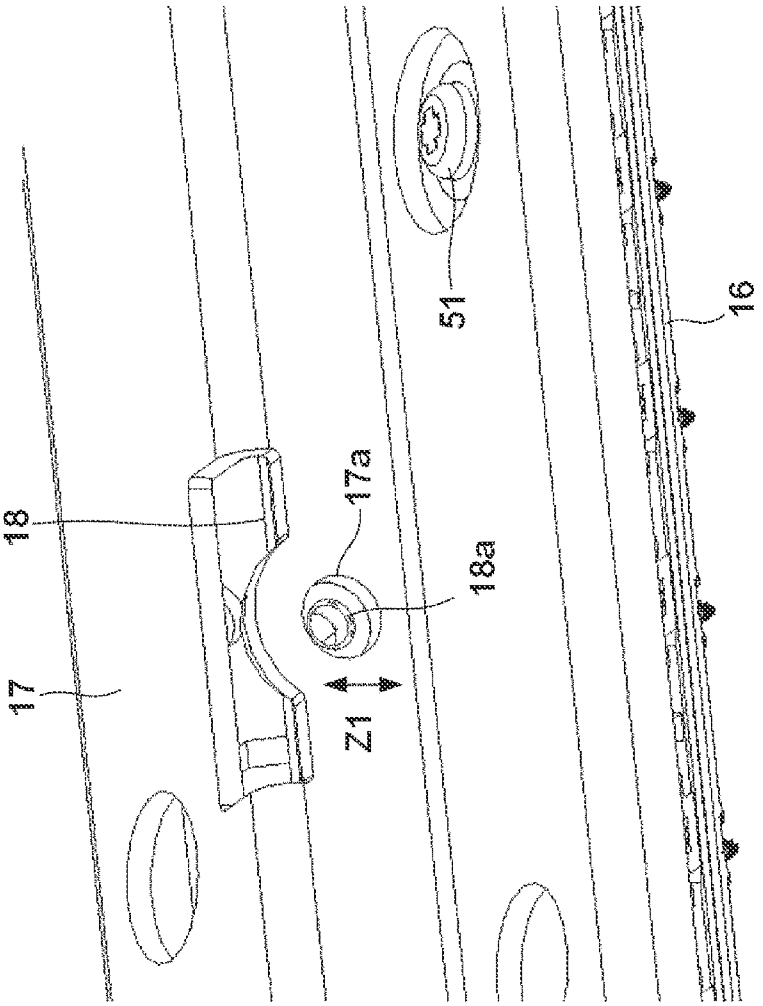
FIG. 10 is an enlarged view of a section P in FIG. 8 (a state in which screws are removed)

A more detailed description will be made with reference to FIGS. 8 to 10. FIG. 8 is a perspective view of the assembly of the holding member 16, the base member 17, and the height adjustment member 18, and FIG. 9 is an exploded perspective view thereof. In FIGS. 8 and 9, the spurs 42 and the regulation members 12 are not illustrated. FIG. 10 is an enlarged view of a section P in FIG. 8, and shows a state in which the screws 50 are removed.

The holding member 16, the base member 17, and the height adjustment member 18 are each a long member extended in the Y direction. In the base member 17, fixing holes 17*a* each configured to receive the screw shaft of the screw 50 are formed at a plurality of points in the Y direction. In the height adjustment member 18, screw holes 18*a* each configured to threadably engage with the screw 50 are formed at a plurality of points in the Y direction in correspondence with the fixing holes 17*a*. The holding member 16 and the height adjustment member 18 are fixed by the screws 51 at the plurality of points in the Y direction.

The fixing hole 17*a* is a hole whose diameter is larger than that of the screw shaft of the screw 50, and has such a size that allows the position where the screw shaft passes to change in the vertical direction, as indicated by an arrow Z1 in FIG. 10. That is, the relative fixing position between each fixing hole 17*a* and a corresponding screw hole 18*a* in the Z direction can be adjusted. This can adjust the position of the holding member 16 in the height direction with respect to the base member 17. That is, the height of the regulation member 12 can be adjusted.

Here, if a print medium with a long width (Y direction) should be handled, the holding member 16, the base member 17, and the height adjustment member 18 become long in the Y direction in accordance with the maximum size of the print medium that the printing apparatus 1 can handle. If these members become long in the Y direction, the heights of the regulation members 12 become unstable because of the warp of the members. In this embodiment, the relative position between each fixing hole 17*a* and a corresponding screw hole 18*a* in the Z direction is individually adjusted, thereby adjusting the warp of the height adjustment member 18 and the holding member 16 in the Y direction and thus individually adjusting the height of each regulation member 12.

Figure 11:
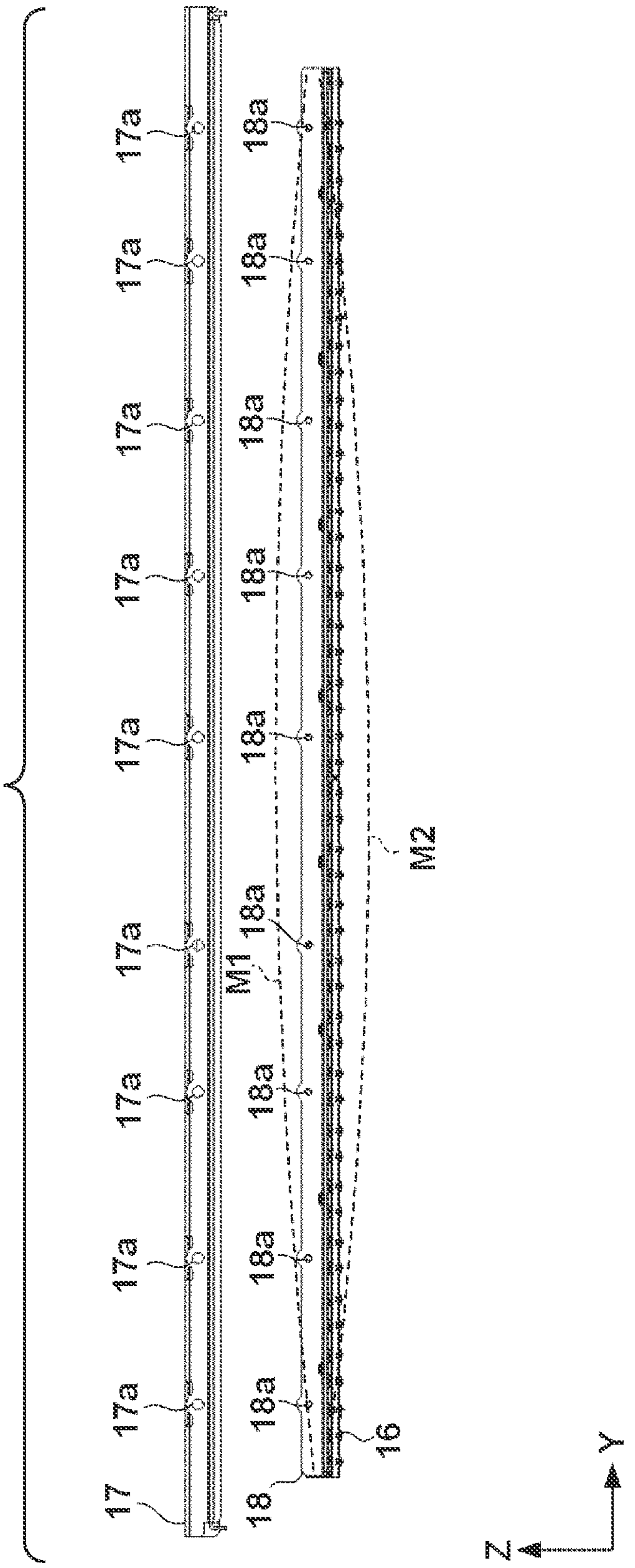
FIG. 11 is an explanatory view of warp of the height adjustment member.

In this embodiment, the relationship of the Y-direction bending strength between the holding member 16, the base member 17, and the height adjustment member 18 is represented by base member 17>height adjustment member 18>holding member 16. Hence, the height adjustment member 18 can be fixed with respect to the base member 17 while being warped as indicated by a broken line M1 or a broken line M2 in FIG. 11, and the holding member 16 can also be fixed while being warped following the warp of the height adjustment member 18. That is, when the warp of the height adjustment member 18 is adjusted, the variation of the height of each regulation member 12 can be eliminated. The height of the regulation member 12 that suppresses a lift of the print medium can thus be adjusted.

<Control of Margin>

If the curl of the leading edge of the roll sheet SH2 is large, the leading edge margin amount of the roll sheet SH2 may be controlled to more reliably prevent contact between the printhead 6 and the roll sheet SH2. This will be described with reference to the example shown in FIGS. 6A and 6B.

If the curl of the leading edge of the roll sheet SH2 is large, printing is not started at the stage when the leading edge of the roll sheet SH2 is located on the platen section 80, as in the state shown in FIG. 6A. Printing is started at the stage when the leading edge of the roll sheet SH2 has reached the connecting section 83, as in the state shown in FIG. 6B. Hence, even if the curl of the leading edge of the roll sheet SH2 is large, contact between the printhead 6 and the roll sheet SH2 can more reliably be prevented at the time of printing.

Note that the leading edge margin amount may be controlled based on information that the control unit 14 can recognize, such as the type of the print medium, the print mode, the environmental temperature and the environmental humidity in the installation place of the printing apparatus 1, or the remaining amount of the roll sheet. For example, for a print medium of a type with large curl, the margin amount is increased, thereby starting printing at the stage when the leading edge of the print medium has reached a predetermined position of the declined section 84 in the X direction. This can more reliably prevent contact between the printhead 6 and the roll sheet SH2 at the time of printing.

Similarly, if the environmental temperature and the environmental humidity are lower than assumed temperature and humidity, or if the remaining amount of the roll sheet SH2 is small, the curl of the leading edge of the print medium tends to be large. Hence, the margin amount may be increased to start printing. Also, if a print mode in which printing is performed at a low speed is executed, the margin amount may be increased because the print medium has a longer time to grow the lift.

If the margin amount of the leading edge of the print medium is thus increased, the leading edge of the print medium may be cut by the cutting unit 5 in consideration of the increased margin amount.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-027011, filed, Feb. 24, 2022, which is hereby incorporated by reference herein in its entirety.

What is claimed is:

1. A printing apparatus comprising:

a conveyance unit configured to convey a print medium in a conveyance direction;

a printing unit configured to print an image on the print medium conveyed by the conveyance unit;

a platen section facing the printing unit and configured to support, from a lower side, the print medium conveyed by the conveyance unit;

a regulation unit arranged on a downstream side of the printing unit in the conveyance direction and configured to regulate a height position of the print medium from above the print medium; and a guide section arranged on a downstream side of the platen section in the conveyance direction and configured to guide the conveyance of the print medium, wherein the guide section includes:

a first declined section declined, from the platen section to further downstream in the conveyance direction, in a direction of separating from a support height of the print medium in the platen section;

a second declined section arranged on a downstream side of the first declined section in the conveyance direction and declined, to further downstream in the conveyance direction, in the direction of separating from the support height; and an inclined section inclined, from the second declined section to further downstream in the conveyance direction, in a direction of approaching the support height, a declination of the second declined section is more moderate than that of the first declined section, and the regulation unit faces the guide section.

2. The apparatus according to claim 1, wherein the regulation unit is arranged at a position facing the second declined section.

3. The apparatus according to claim 1, wherein the regulation unit is arranged at a position higher than the support height.

4. The apparatus according to claim 1, further comprising a discharge unit arranged on the downstream side of the printing unit in the conveyance direction and configured to discharge the print medium conveyed by the conveyance unit, wherein the discharge unit includes;

a first rotary body; and a second rotary body facing the first rotary body, the print medium is conveyed while being nipped between the first rotary body and the second rotary body, and a nip position between the first rotary body and the second rotary body is located at a position higher than the support height.

5. The apparatus according to claim 1, further comprising a discharge unit arranged on the downstream side of the printing unit in the conveyance direction and configured to discharge the print medium conveyed by the conveyance unit, wherein the discharge unit includes:

a first rotary member; and a second rotary member facing the first rotary member, the print medium is conveyed while being nipped between the first rotary member and the second rotary member, and a nip position between the first rotary member and the second rotary member is located at a position higher than a lift regulation position by the regulation unit.

6. The apparatus according to claim 1, wherein the inclined section includes a section curved and extended from the second declined section.

7. The apparatus according to claim 1, wherein the regulation unit is a rotatably provided rotary member.

8. The apparatus according to claim 1, wherein the platen section includes a plurality of ribs arrayed in a direction intersecting the conveyance direction, the plurality of ribs are extended in the conveyance direction, and the plurality of ribs include ribs of different heights.

9. The apparatus according to claim 8, wherein the regulation unit comprises a plurality of rotary members provided in correspondence with the plurality of ribs in the direction intersecting the conveyance direction.

10. The apparatus according to claim 1, wherein the guide section includes a connecting section extending in parallel to the support height and configured to connect the first declined section and the second declined section.

11. The apparatus according to claim 10, wherein a width of the second declined section in the conveyance direction is longer than that of the connecting section.

12. The apparatus according to claim 10, wherein a width of the second declined section in the conveyance direction is longer than a total width of the connecting section and the first declined section in the conveyance direction.

* * * * *